United States Patent
Grzonkowski et al.

(10) Patent No.: US 11,288,369 B1
(45) Date of Patent: Mar. 29, 2022

(54) SYSTEMS AND METHODS FOR DETECTING AND PROTECTING AGAINST MALICIOUS USE OF LEGITIMATE COMPUTING-SYSTEM TOOLS

(71) Applicant: CA, INC., San Jose, CA (US)

(72) Inventors: Slawomir Grzonkowski, Dublin (IE); Aditya Kuppa, Dublin (IE)

(73) Assignee: CA, INC., New York, NY (US)

(*) Notice: Subject to any disclaimer, the term of this patent is extended or adjusted under 35 U.S.C. 154(b) by 420 days.

(21) Appl. No.: 16/368,096

(22) Filed: Mar. 28, 2019

(51) Int. Cl.
  *G06F 21/55* (2013.01)
  *G06F 21/56* (2013.01)
  *G06F 21/60* (2013.01)
  *G06F 21/57* (2013.01)

(52) U.S. Cl.
  CPC ........ *G06F 21/566* (2013.01); *G06F 21/552* (2013.01); *G06F 21/554* (2013.01); *G06F 21/57* (2013.01); *G06F 21/60* (2013.01)

(58) Field of Classification Search
  None
  See application file for complete search history.

(56) References Cited

U.S. PATENT DOCUMENTS

| | | | |
|---|---|---|---|
| 8,161,548 B1* | 4/2012 | Wan | G06K 9/6228 726/22 |
| 9,998,484 B1* | 6/2018 | Buyukkayhan | G06F 16/285 |
| 2012/0227105 A1* | 9/2012 | Friedrichs | G06F 21/564 726/22 |
| 2015/0220735 A1* | 8/2015 | Paithane | G06F 21/53 726/23 |
| 2016/0342787 A1* | 11/2016 | Wang | G06K 9/00536 |
| 2019/0311119 A1* | 10/2019 | Wang | G06N 3/08 |

\* cited by examiner

*Primary Examiner* — Joseph P Hirl
*Assistant Examiner* — Hassan Saadoun
(74) *Attorney, Agent, or Firm* — Foley & Lardner LLP

(57) ABSTRACT

A computer-implemented method for detecting and protecting against malicious use of legitimate computing-system tools may include (i) identifying a computing-system tool that can perform benign actions and malicious actions on a computing system, (ii) creating a set of recorded actions by recording actions performed by the computing-system tool on the computing system over a predetermined period of time, (iii) analyzing the set of recorded actions via a machine learning method that, for each action in the set of recorded actions, determines whether the action is anomalous compared to other actions in the set, (iv) classifying an action in the set of recorded actions as malicious based at least in part on determining that the action is anomalous, and (v) initiating, in response to classifying the action as malicious, a security action related to the action. Various other methods, systems, and computer-readable media are also disclosed.

20 Claims, 7 Drawing Sheets

SYSTEMS AND METHODS FOR DETECTING AND PROTECTING AGAINST MALICIOUS USE OF LEGITIMATE COMPUTING-SYSTEM TOOLS

BACKGROUND

Computing systems of all sort are plagued by malware that deletes or encrypts crucial files, steals information, sends spam, or performs other sorts of malicious action. A large number of anti-malware tools exist to prevent and detect various types of malware. In many cases, anti-malware programs may detect that an application is performing malicious or suspicious actions, classify the application as potential malware, and quarantine or delete the application. However, this technique may not work when it comes to malware that performs malicious actions via system tools. Because system tools are often default parts of the operating system, they may have high reputation scores, making them difficult to identify as suspicious. Additionally, because system tools may be a critical part of the operating system and/or necessary for performing benign actions, anti-malware tools may not have the option of quarantining or deleting system tools.

Unfortunately, many traditional anti-malware applications may have no tools for handling applications that perform malicious actions and also benign actions. In some circumstances, anti-malware tools may fail to detect malicious actions entirely when those malicious actions originate from a trusted application. Accordingly, the instant disclosure identifies and addresses a need for additional and improved systems and methods for detecting and protecting against malicious use of legitimate computing-system tools.

SUMMARY

As will be described in greater detail below, the instant disclosure generally relates to systems and methods for detecting and protecting against malicious use of legitimate computing-system tools by comparing recorded actions to identify anomalous, potentially malicious actions.

In one example, a computer-implemented method for detecting malicious use of legitimate tools may include (i) identifying a computing-system tool that can perform benign actions and malicious actions on a computing system, (ii) creating a set of recorded actions by recording actions performed by the computing-system tool on the computing system over a predetermined period of time, (iii) analyzing the set of recorded actions via a machine learning method that, for each action in the set of recorded actions, determines whether the action is anomalous compared to other actions in the set of recorded actions, (iv) classifying an action in the set of recorded actions as malicious based at least in part on determining that the action is anomalous compared to the other actions in the set of recorded actions, and (v) initiating, in response to classifying the action as malicious, a security action related to the action.

In some examples, performing the security action may include sending a representation of the action to a security application capable of detecting malicious actions in real-time based on stored representations of the malicious actions. In some examples, identifying the computing-system tool may include identifying the computing-system tool that is installed as part of a default configuration of an operating system of the computing system.

In some embodiments, analyzing the set of recorded actions via the machine learning method may include analyzing the set of recorded actions via an autoencoder neural network. In one embodiment, analyzing the set of recorded actions via the machine learning method may include generating, by the machine learning method, a signature for each action in the set of recorded actions.

In some examples, classifying the action in the set of recorded actions as malicious based at least in part on determining that the action is anomalous compared to the other actions in the set of recorded actions may include comparing a signature for the action with signatures for the other actions. In some examples, classifying the action in the set of recorded actions as malicious may include comparing the action to at least one labelled action of a known maliciousness category. Additionally or alternatively, classifying the action in the set of recorded actions as malicious based at least in part on determining that the action is anomalous compared to the other actions in the set of recorded actions may include comparing the action to the other actions via a radial classifier.

In one embodiment, creating the set of recorded actions by recording actions performed by the computing-system tool on the computing system over the predetermined period of time may include recording actions performed by iterations of the computing-system tool on a group of computing systems over the predetermined period of time. In some embodiments, classifying the action in the set of recorded actions as malicious based at least in part on determining that the action is anomalous compared to the other actions in the set of recorded actions may include comparing the action to recorded actions performed on the computing systems.

In one embodiment, a system for implementing the above-described method may include (i) an identification module, stored in memory, that identifies a computing-system tool that can perform benign actions and malicious actions on a computing system, (ii) a creation module, stored in memory, that creates a set of recorded actions by recording actions performed by the computing-system tool on the computing system over a predetermined period of time, (iii) an analysis module, stored in memory, that analyzes the set of recorded actions via a machine learning method that, for each action in the set of recorded actions, determines whether the action is anomalous compared to other actions in the set of recorded actions, (iv) a classification module, stored in memory, that classifies an action in the set of recorded actions as malicious based at least in part on determining that the action is anomalous compared to the other actions in the set of recorded actions, (v) an security module, stored in memory, that initiates, in response to classifying the action as malicious, a security action related to the action, and (vi) at least one physical processor that executes the identification module, the creation module, the analysis module, the classification module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a computing-system tool that can perform benign actions and malicious actions on a computing system, (ii) create a set of recorded actions by recording actions performed by the computing-system tool on the computing system over a predetermined period of time, (iii) analyze the set of recorded actions via a machine learning method that, for each action in the set of recorded actions, determines whether the action is anomalous compared to other actions in the set of recorded actions, (iv) classify an action in the set of recorded actions as malicious based at least in part on determining that the action is anomalous compared to the other actions in the set of recorded actions, and (v) initiate, in response to classifying the action as malicious, a security action related to the action.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
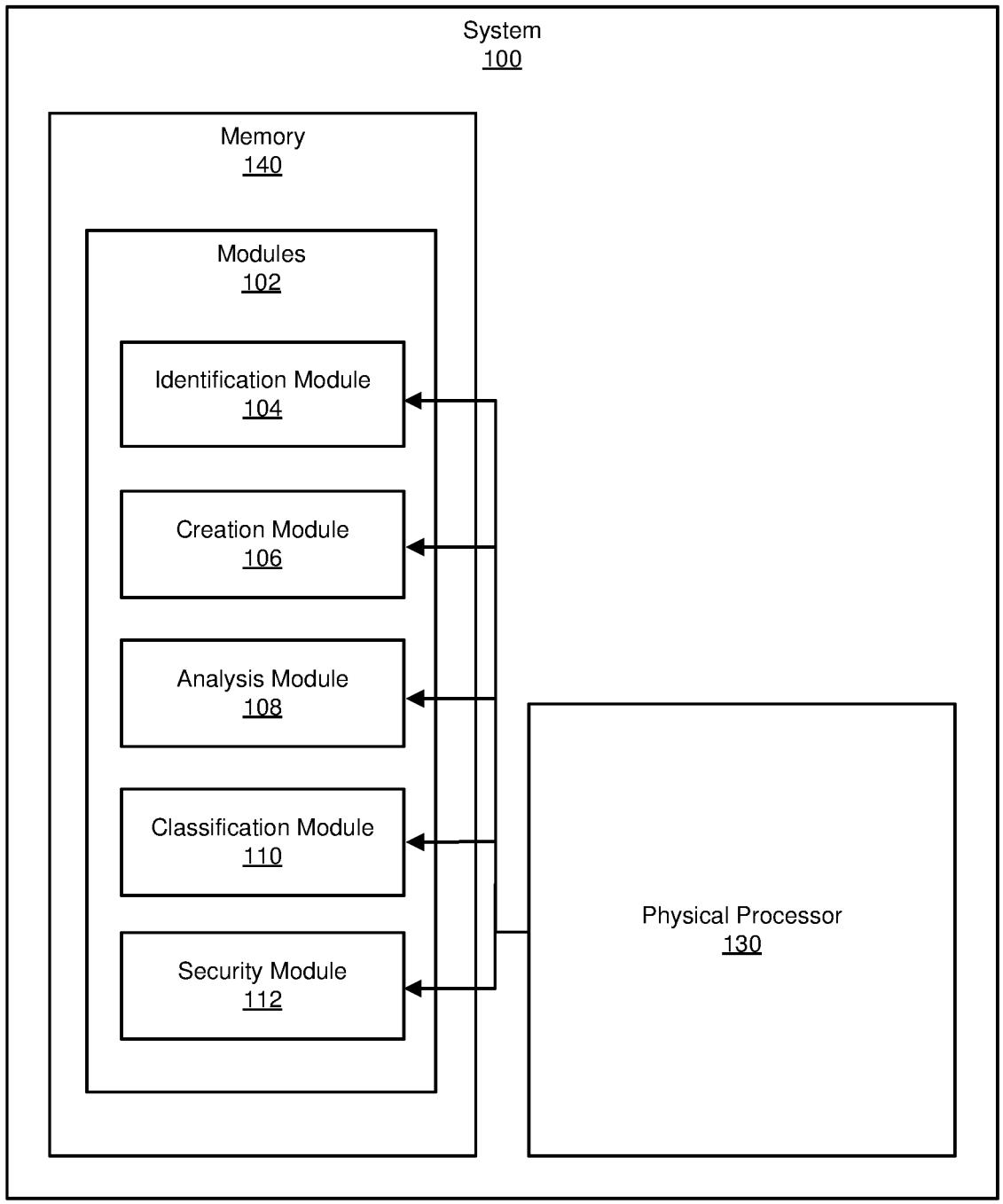
FIG. 1 is a block diagram of an example system for detecting and protecting against malicious use of legitimate computing-system tools.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting and protecting against malicious use of legitimate computing-system tools. In some cases, an attacker may use a legitimate computing-system tool to perform malicious actions, launch other tools that perform malicious actions, and/or otherwise obscure malicious actions. Because a computing-system tool may be frequently used for performing benign actions, it may be impractical to uninstall the tool or otherwise prevent the tool from performing actions. In some cases, detecting malicious actions performed by a computing-system tool may be difficult due to the tool itself being benign and/or due to the wide variety of actions performed by the tool. As will be explained in greater detail below, by creating a set of recorded actions over a predetermined period of time and then analyzing those actions to determine anomalous actions, the systems described herein may identify malicious actions performed by computing-system tools without interfering with benign actions. In some embodiments, the systems described herein may record data over multiple computing systems, increasing the pool of available data and increasing the accuracy of anomaly detection by reducing false positives. In some embodiments, the systems and methods described herein may improve the functioning of a computing device and/or the field of computing security by accurately identifying malicious actions performed by computing-system tools.

The following will provide, with reference to FIGS. 1, 2, 4, and 5, detailed descriptions of example systems for detecting and protecting against malicious use of legitimate computing-system tools. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 6 and 7, respectively.

FIG. 1 is a block diagram of example system 100 for detecting malicious use of legitimate tools. As illustrated in this figure, example system 100 may include one or more modules 102 for performing one or more tasks. For example, and as will be explained in greater detail below, example system 100 may include an identification module 104 that identifies a computing-system tool that can perform benign actions and malicious actions on a computing system. Example system 100 may additionally include a creation module 106 that creates a set of recorded actions by recording actions performed by the computing-system tool on the computing system over a predetermined period of time. Example system 100 may also include an analysis module 108 that analyzes the set of recorded actions via a machine learning method that, for each action in the set of recorded actions, determines whether the action is anomalous compared to other actions in the set of recorded actions. Example system 100 may additionally include a classification module 110 that classifies an action in the set of recorded actions as malicious based at least in part on determining that the action is anomalous compared to the other actions in the set of recorded actions. Example system 100 may also include a security module 112 that initiates, in response to classifying the action as malicious, a security action related to the action. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of example network architecture 700 in FIG. 7. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting and protecting against malicious use of legitimate computing-system tools. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
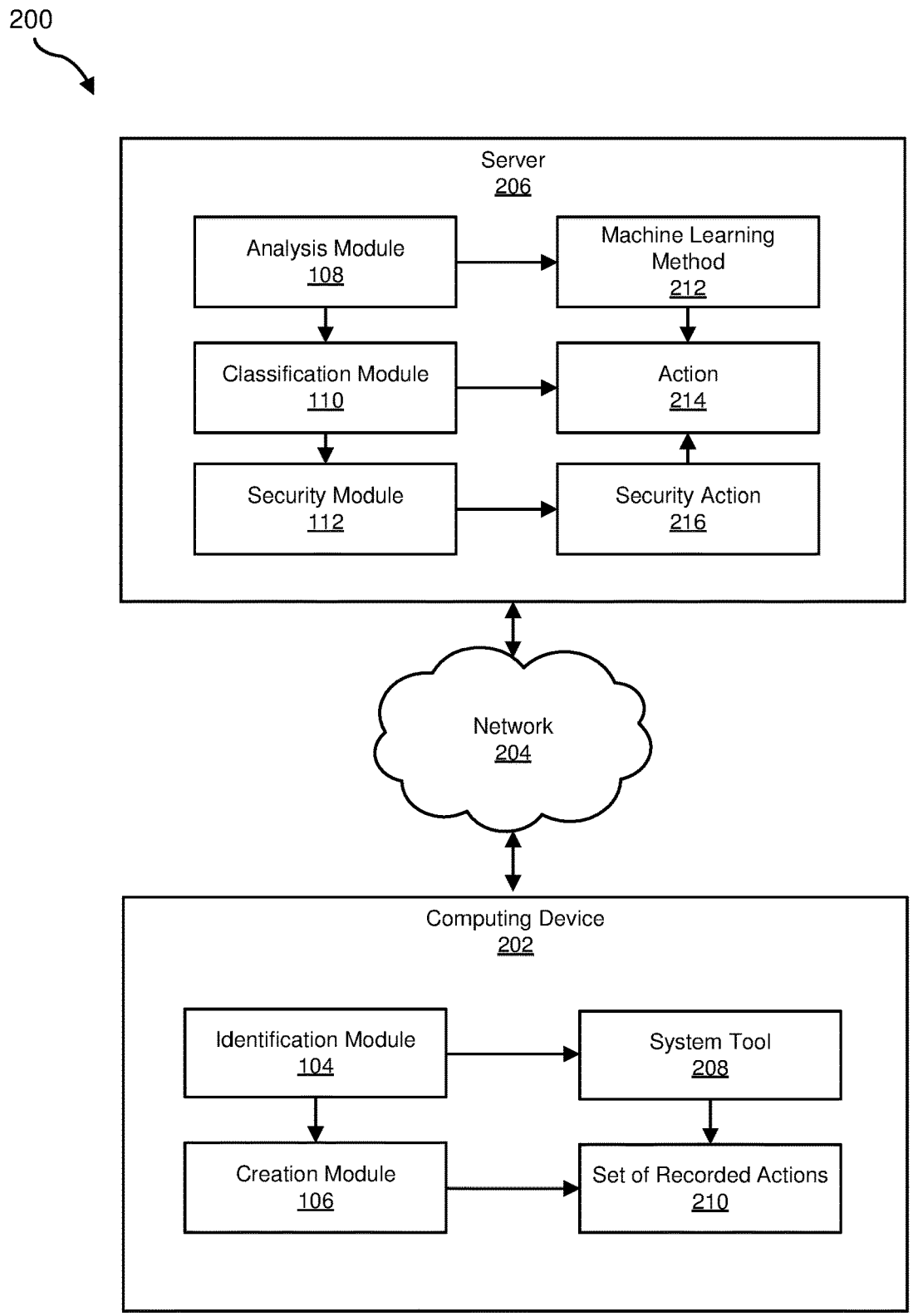
FIG. 2 is a block diagram of an additional example system for detecting and protecting against malicious use of legitimate computing-system tools.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to detect malicious use of legitimate tools. For example, and as will be described in greater detail below, identification module 104 may identify a system tool 208 that can perform benign actions and malicious actions on a computing device 202. In some embodiments, creation module 106 may create a set of recorded actions 210 by recording actions performed by system tool 208 on computing device 202 over a predetermined period of time. After the end of the predetermined period of time, analysis module 108 may analyze set of recorded actions 210 via a machine learning method 212 that, for each action 214 in set of recorded actions 210, determines whether action 214 is anomalous compared to other actions in set of recorded actions 210. In some examples, classification module 110 may classify action 214 as malicious based at least in part on determining that action 214 is anomalous compared to the other actions in set of recorded actions 210. In one example, security module 112 may initiate, in response to classifying action 214 as malicious, a security action 216 related to action 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, example computing system 610 in FIG. 6, or any other suitable computing device.

Server 206 generally represents any type or form of computing device that is capable of analyzing and/or classifying recorded actions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), example network architecture 700 in FIG. 7, or the like. Network 204 may facilitate communication or data transfer using wireless or wired connections. In one embodiment, network 204 may facilitate communication between computing device 202 and server 206.

Figure 3:
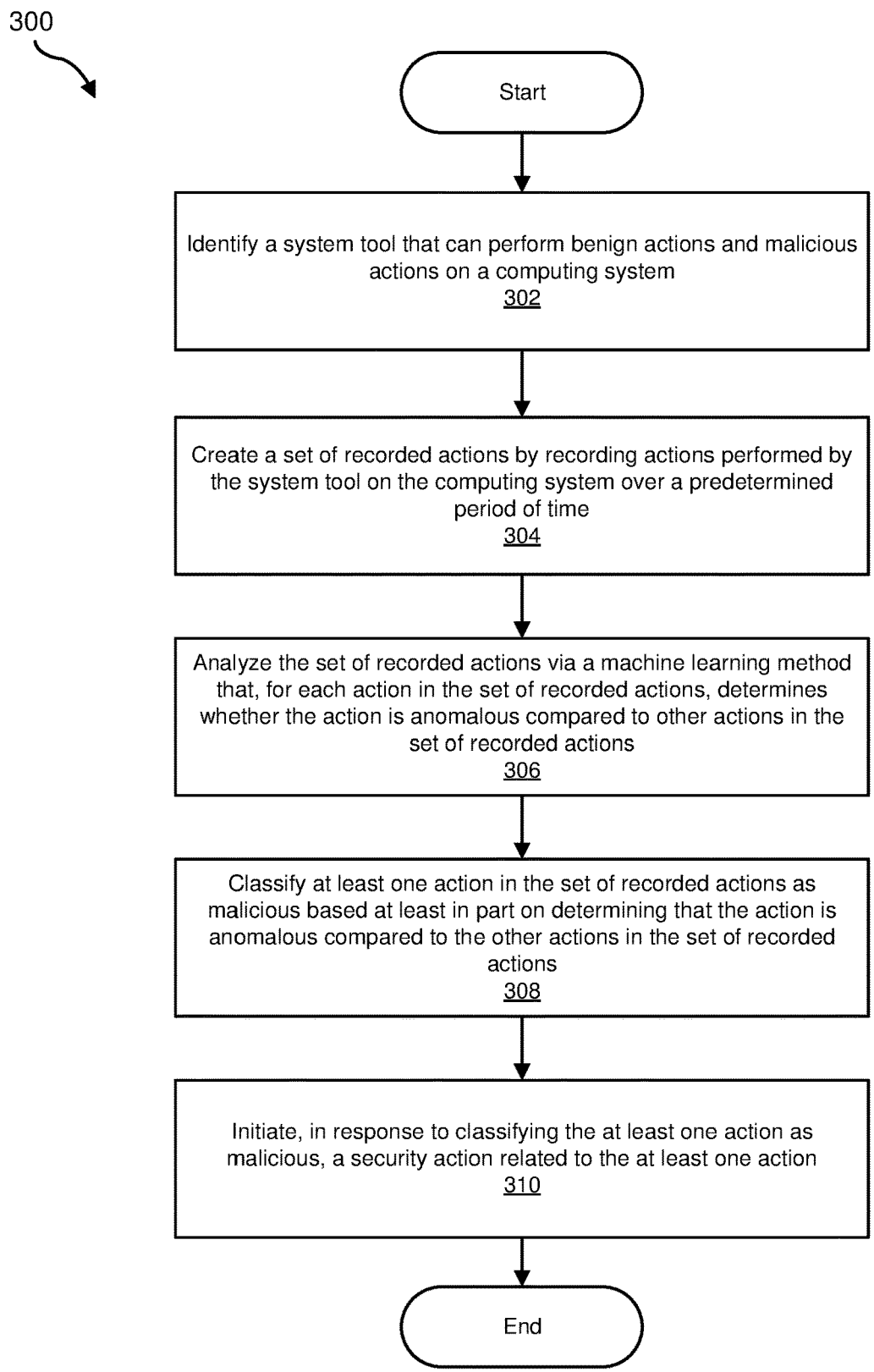
FIG. 3 is a flow diagram of an example method for detecting and protecting against malicious use of legitimate computing-system tools.

FIG. 3 is a flow diagram of an example computer-implemented method 300 for detecting and protecting against malicious use of legitimate computing-system tools. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of example network architecture 700 in FIG. 7.

As illustrated in FIG. 3, at step 302, one or more of the systems described herein may identify a computing-system tool that can perform benign actions and malicious actions on a computing system. For example, identification module 104 may, as part of computing device 202 in FIG. 2, identify system tool 208 that can perform benign actions and malicious actions on computing device 202.

The term "computing-system tool" or "system tool," as used herein, generally refers to any application that is capable of performing both malicious and benign actions on a computing device. In some example, a system tool may be an application that has a high level of access permissions. for example, a system tool may have administrative access to perform actions on a computing system. In some examples, a system tool may be installed as part of the default configuration of an operating system and/or may be integral to the operating system. Examples of system tools may include, without limitation, WINDOWS management instrumentation, WINDOWS remote management, system center operations manager, and/or WINDOWS POWERSHELL.

The term "malicious action," as used herein, generally refers to any action that is intended to cause harm to a computing system, the contents of the computing system, and/or the owner and/or operator of the computing system. In some examples, a particular action may be malicious in one context and benign in another context. For example, deleting a file may be benign when it is a duplicate and/or deprecated file but malicious when the file is a critical file the loss of which will impair the functioning of the computing system. In some examples, the term "malicious action" may encompass a series of actions. For example, a malicious action may include copying the contents of a sensitive file and sending that data to a server. Other examples of malicious actions may include, without limitation, encrypting files, sending information, sending messages, modifying files, and/or downloading files. The term "benign action," as used herein, generally refers to any action that is not malicious.

Identification module 104 may identify the computing-system tool in a variety of ways and/or contexts. For example, identification module 104 may receive a list of one or more computing-system tools that includes the computing-system tool. In some embodiments, identification module 104 may automatically identify the computing-system tool by examining characteristics of the computing-system tool, such as the publisher of the tool, the permissions level of the tool, and/or actions performed by the tool. In one embodiment, identification module 104 may be part of a security application installed on the computing system.

At step 304, one or more of the systems described herein may create a set of recorded actions by recording actions performed by the computing-system tool on the computing system over a predetermined period of time. For example, creation module 106 may, as part of computing device 202 in FIG. 2, create set of recorded actions 210 by recording actions performed by system tool 208 on computing device 202 over a predetermined period of time.

Creation module 106 may record the set of actions over the period of time in a variety of ways. For example, creation module 106 may create a record locally and then send the record to a server at the end of the predetermined period of time. In another embodiment, creation module 106 may send each recorded action to a server as the action is recorded. Examples of predetermined periods of time may include, without limitation, one day, one week, one month, and/or two months.

At step 306, one or more of the systems described herein may analyze the set of recorded actions via a machine learning method that, for each action in the set of recorded actions, determines whether the action is anomalous compared to other actions in the set of recorded actions. For example, analysis module 108 may, as part of computing device 202 in FIG. 2, analyze set of recorded actions 210 via machine learning method 212 that, for each action 214 in set of recorded actions 210, determines whether action 214 is anomalous compared to other actions in set of recorded actions 210.

The phrase "machine learning method," as used herein, generally refers to any algorithm that makes predictions about data based on previously seen data. In some embodiments, the systems described herein may use a machine learning model that is partially trained based on labelled data. Additionally or alternatively, the systems described herein may use an unsupervised algorithm that does not receive manually labelled data. In one embodiment, the machine learning method may include a neural network that is composed of a collection of artificial neurons arranged into layers.

Analysis module 108 may analyze the set of recorded actions in a variety of ways and/or contexts. For example, analysis module 108 may analyze the actions from a single computing system. In another embodiment, analysis module 108 may analyze actions collected from multiple computing systems. In some embodiments, analysis module 108 may analyze actions by identifying attributes of the actions, such as process lineage (e.g., what process launched the action and/or was launched by the action), types of actions, types and/or identifiers of resources accessed by the action, attributes of the operating system on which the action is being performed, and/or any additional attributes of the action.

Figure 4:
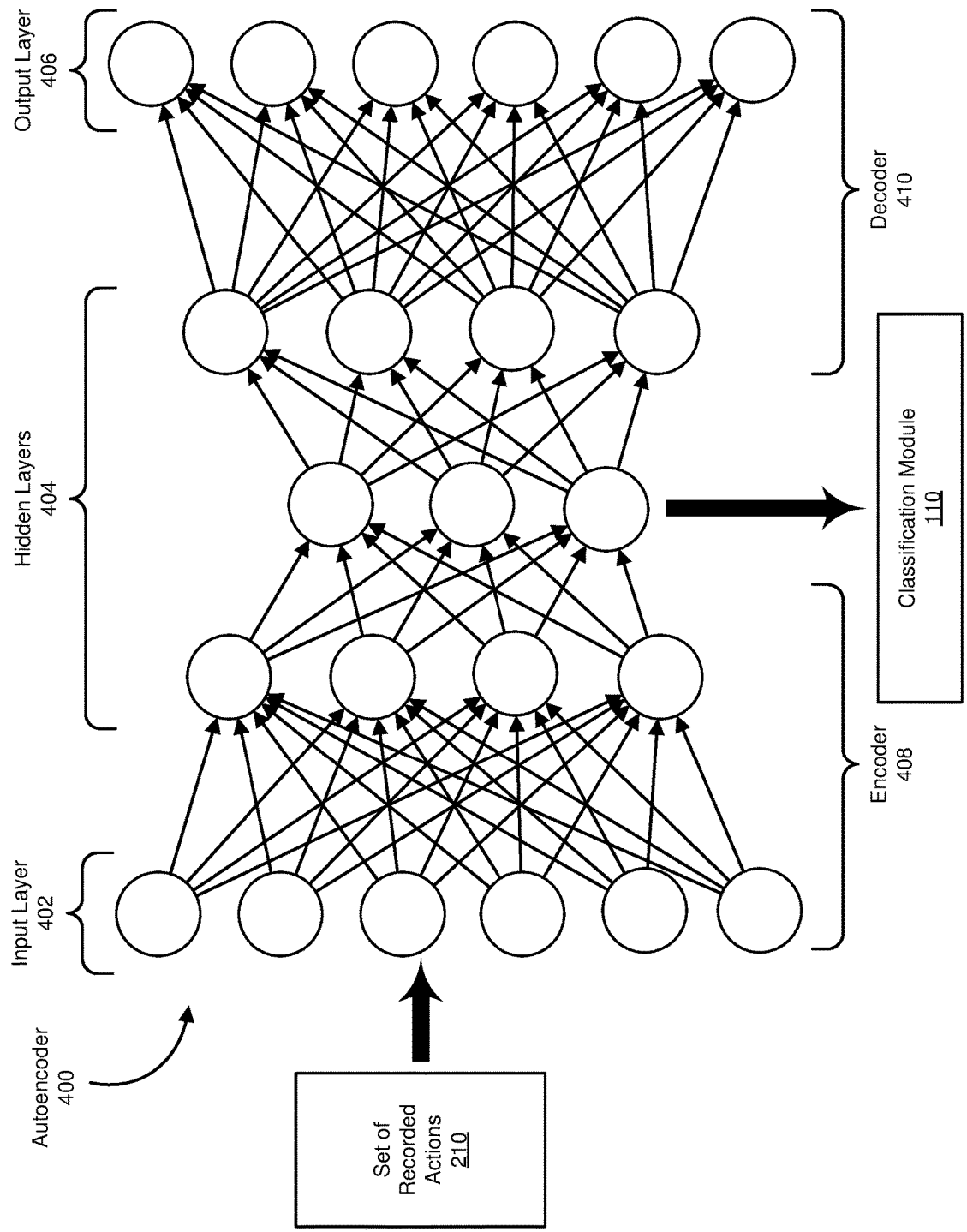
FIG. 4 is a block diagram of an example computing system for detecting and protecting against malicious use of legitimate computing-system tools.

In some examples, analysis module 108 may use an autoencoder neural network to analyze the set of recorded actions. In some embodiments, an autoencoder neural network may have a layer of input neurons that match a layer of output neurons (e.g., in number) and/or one or more hidden layers. For example, as illustrated in FIG. 4, an autoencoder 400 may include an input layer 402, an output layer 406 with the same number of neurons as input layer 402, and one or more hidden layers 404 that each have fewer neurons that input layer 402. In some examples, input layer 402 and one or more of hidden layers 404 may function as an encoder 408 while output layer 406 and other layers within hidden layers 404 may function as a decoder 410 that attempts to produce the same values on output layer 406 that were received by input layer 402. In some embodiments, the most sparse (i.e., fewest neurons) layer of hidden layers 404 may produce a set of values that function as a signature of the data received by input layer 402. In some examples, hidden layers 404 may produce a signature of the recorded action that is sent to classification module 110. In some embodiments, input layer 402 may receive data from set of recorded actions 210.

In one embodiment, if the data produced by decoder 410 does not match the data received by input layer 402 and encoded by encoder 408, the systems described herein may determine that the data (i.e., the action) is anomalous compared to other data processed by autoencoder 400 (i.e., other recorded actions). For example, if the input values received by input layer 402 are [1,0,1,0,1,0] then an output of [1,0,1,0,1,0] has a reconstruction error rate of zero while an output of [1,0,1,0,1,1] has a reconstruction error rate of 17%. In some embodiments, the systems described herein may determine that any action that produces a reconstruction error above a predetermined threshold is anomalous.

Returning to FIG. 3, at step 308, one or more of the systems described herein may classify an action in the set of recorded actions as malicious based at least in part on determining that the action is anomalous compared to the other actions in the set of recorded actions. For example, classification module 110 may, as part of computing device 202 in FIG. 2, classify action 214 as malicious based at least in part on determining that action 214 is anomalous compared to the other actions in set of recorded actions 210.

The term "anomalous," as used herein, generally refers to any action that is unusual when compared to other recorded actions. In some examples, an anomalous action may only occur once in a set of recorded actions. Additionally or alternatively, an anomalous action may occur several times and/or several similar anomalous actions may occur but may still be unusual and/or have an unusual signature compared to the majority of actions recorded during the predetermined time period. For example, an anomalous action may involve an attribute seldom found in other actions (such as a connection with a particular remote server), a rare combination of attributes (such as encrypting a document and then immediately sending a message), and/or any other type of characteristic that distinguishes the action. In some embodiments, an action may be classified as anomalous if an autoencoder cannot reconstruct the action and/or if the reconstruction error is above a predefined threshold.

Classification module 110 may classify the action as malicious in a variety of ways and/or contexts. For example, classification module 110 may classify the action as malicious solely because the action is anomalous. Alternatively, classification module 110 may classify the action as malicious after performing a further analysis on actions found to be anomalous. In some embodiments, classification module 110 may only classify anomalous actions and not non-anomalous actions.

In some embodiments, classification module 110 may classify the action as malicious by comparing a signature for the action with signatures for the other actions. For example, classification module 110 may compare a signature generated by a hidden layer of an autoencoder.

In some examples, classification module 110 may classify action as malicious by comparing the action to at least one labelled action of a known maliciousness category. For example, classification module 110 may classify the action as malicious in response to determining that the action has a similar signature to an action that is known to be malicious. In another example, classification module 110 may classify an action as benign in response to determining that the action has a similar signature to an action that is known to be benign.

In some examples, classification module 110 may classify the action as malicious by comparing the action to the other actions via a radial classifier. For example, the signatures generated by an autoencoder may, when graphed, cluster together into various groups. In some examples, an action that is grouped with known benign actions may be benign while an action that is grouped with known malicious actions and/or is not grouped with other actions may be malicious. In some embodiments, a radial classifier may be trained using manually-labelled samples of malicious and/or benign actions. In some embodiments, a radial classifier may identify new anomalous actions separately from previously-detected anomalous actions.

At step 310, one or more of the systems described herein may initiate, in response to classifying the action as malicious, a security action related to the action. For example, security module 112 may, as part of computing device 202 in FIG. 2, initiate, in response to classifying action 214 as malicious, security action 216 related to action 214.

Security module 112 may perform a variety of security actions. For example, security module 112 may send a representation of the action to a security application capable of detecting malicious actions in real-time based on stored representations of the malicious actions. Additionally or alternatively, security module 112 may alert a user and/or administrator about the malicious action and/or provide digital forensic data about the malicious action.

Figure 5:
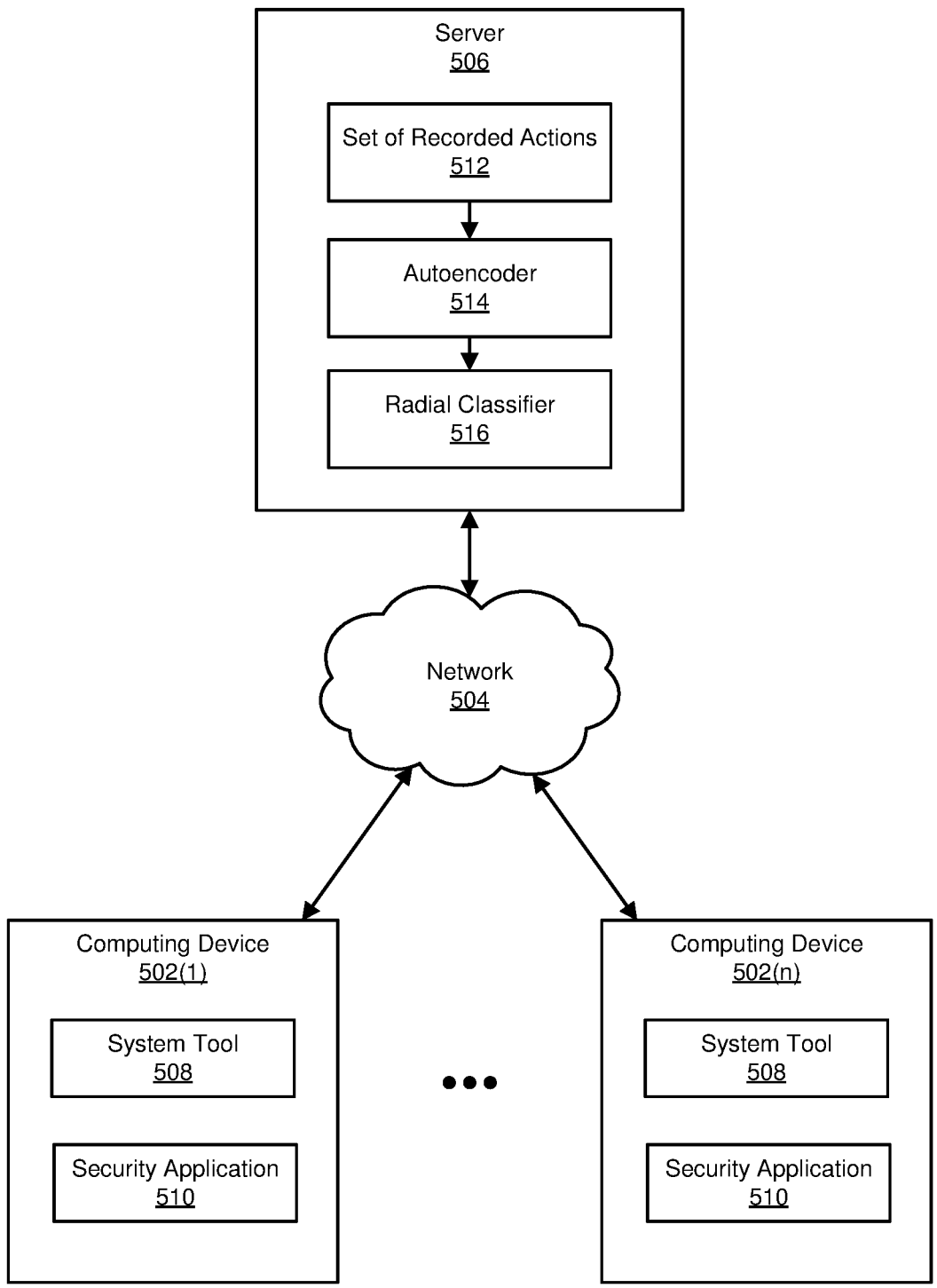
FIG. 5 is a block diagram of an example computing system for detecting and protecting against malicious use of legitimate computing-system tools.

In some embodiments, the systems described herein may collect data from and/or send data to security actions on multiple computing devices. For example, as illustrated in FIG. 5, iterations of an application on computing devices 502(1) through 502(n) may each collect a set of recorded actions performed by system tool 508 during a predetermined period of time. During and/or at the end of the predetermined period of time, on computing devices 502(1) through 502(n) may send that data via a network 504 to a server 506 that may consolidate the data into a set of recorded actions 512 that spans multiple computing devices. Although illustrated as a single element, in some embodiments server 506 may represent a distributed computing environment. In one embodiment, server 506 may be constructed with specific hardware, such as a dedicated graphical processing unit, that improves the ability of server 506 to analyze recorded actions. In some embodiments, set of recorded actions 512 may include data from dozens or hundreds of computing devices operated by multiple separate organizations and/or enterprises. In some embodiments, by analyzing data from a large number of computing devices, the systems described herein may reduce false positives. For example, a specific action such as uploading a patch to a server may be an anomaly when compared to other actions on the same computing device but may occur repeatedly across multiple computing devices and thus may not be anomalous and/or malicious.

In one embodiment, an autoencoder 514 may take set of recorded actions 512 as input and produce a set of signatures for the set of actions and/or a set of anomalous actions found within set of recorded actions 512. The systems described herein may then send the signatures of the anomalous actions and/or of all actions in set of recorded actions 512 to a radial classifier 516 that may classify actions as malicious or benign. The systems described herein may then send the signatures of malicious actions to a security application 510 on computing devices 502(1) through 502(n) that may block future occurrences of the malicious actions on computing devices 502(1) through 502(n). In some embodiments, the systems described herein may include a cross-enterprise filter that filters out anomalous actions found only within data from a specific organization. For example, if an administrator at an organization use a system tool to upgrade an internal application, this action may appear anomalous despite being benign. However, if similar anomalous actions occur in data from different organizations, it may be less likely that these anomalous actions are false positives and more likely that the actions are malicious. For these reasons, the systems described herein may use the cross-enterprise filter to avoid classifying actions as malicious of the action only occurs within data from a single organization and/or enterprise.

As explained above in connection with method 300 in FIG. 3, the systems and methods described herein may identify and protect against malicious actions performed by legitimate computing-system tools with a low rate of false positives by collecting data across numerous computing devices, analyzing the data via an autoencoder to detect anomalous actions, and classifying actions as malicious or benign via a radial classifier. In some embodiments, the systems described herein may produce signatures of actions and may supply signatures of malicious actions to a security application to block future instances of those malicious actions without interfering with benign actions performed by legitimate computing-system tools.

Figure 6:
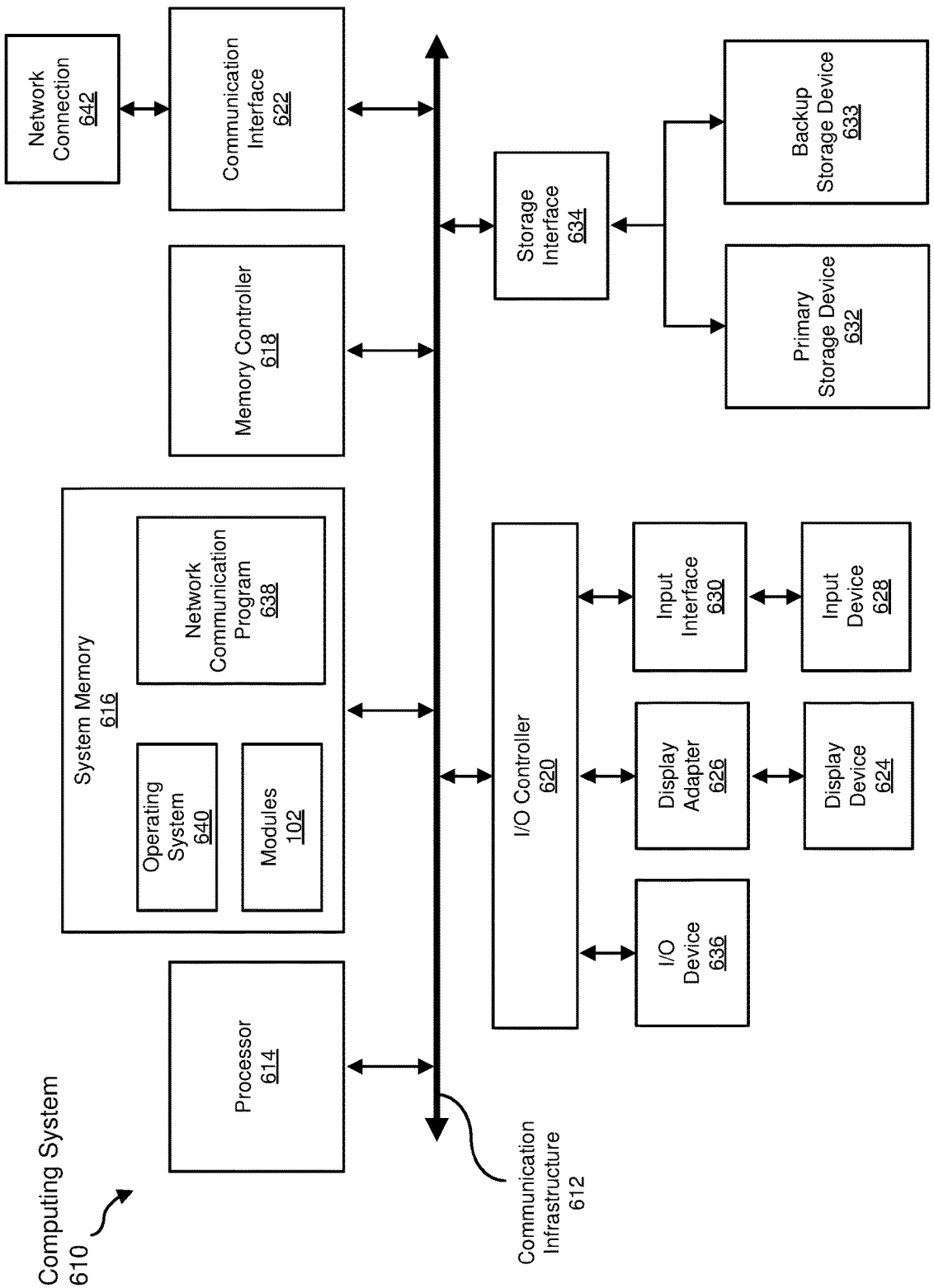
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
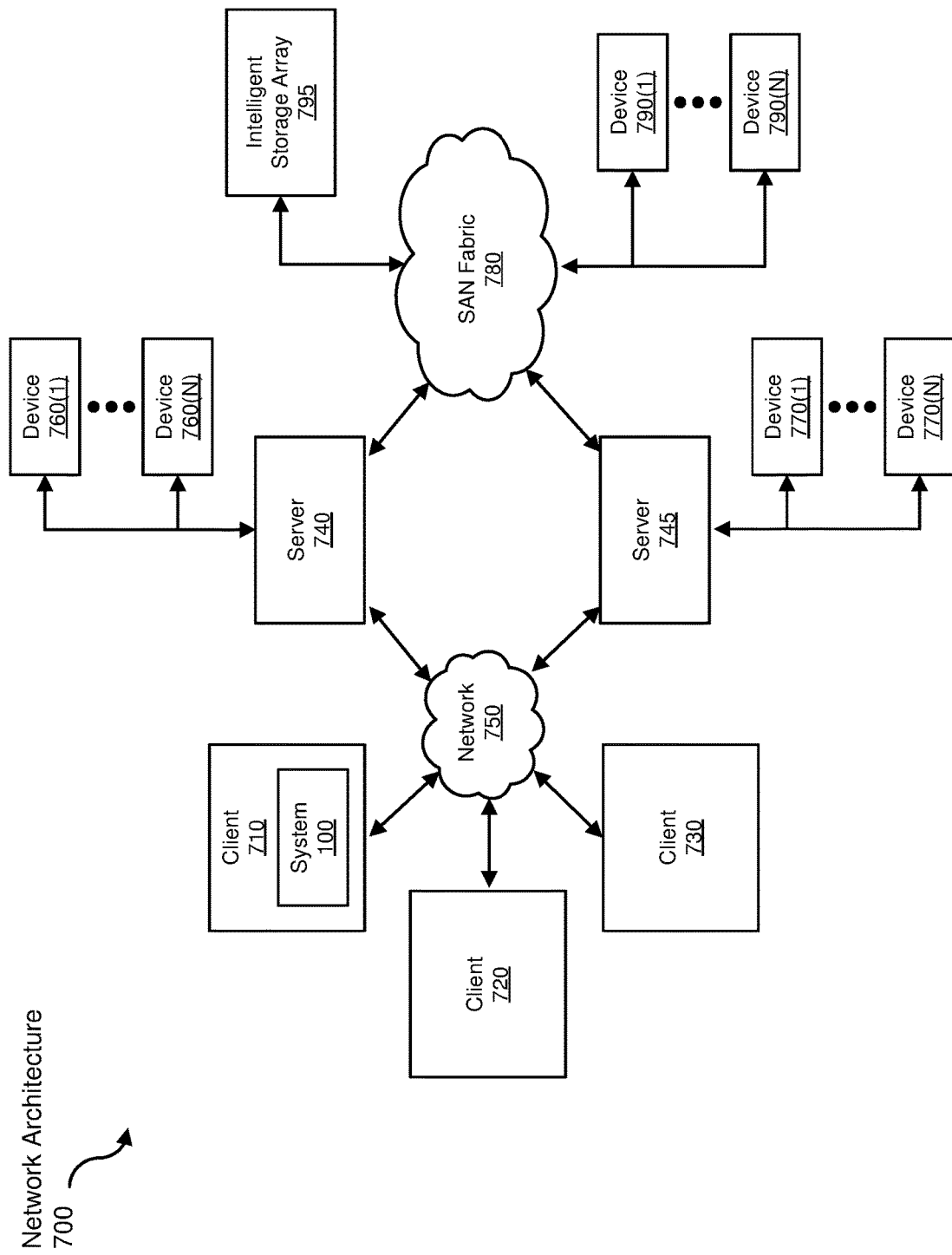
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting and protecting against malicious use of legitimate computing-system tools.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive action records to be transformed into feature vectors for a neural network, transform the action records into feature vectors, output a result of the transformation to a neural network, use the result of the transformation to identify anomalous actions, and store the result of the transformation to produce signatures of actions. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting and protecting against malicious use of legitimate computing-system tools, at least a portion of the method being performed by a computing device comprising at least one processor, the method comprising:
   identifying a computing-system tool that can perform benign actions and malicious actions on a computing system;
   creating a set of recorded actions by recording actions performed by the computing-system tool on the computing system over a predetermined period of time;
   analyzing the set of recorded actions via a machine learning method that, for each action in the set of recorded actions, determines whether the action is anomalous compared to other actions in the set of recorded actions;
   classifying an action in the set of recorded actions as malicious based at least in part on determining that the action is anomalous compared to the other actions in the set of recorded actions; and
   initiating, in response to classifying the action as malicious, a security action related to the action.

2. The computer-implemented method of claim 1, wherein performing the security action comprises sending a representation of the action to a security application capable of detecting malicious actions in real-time based on stored representations of the malicious actions.

3. The computer-implemented method of claim 1, wherein identifying the computing-system tool comprises identifying the computing-system tool that is installed as part of a default configuration of an operating system of the computing system.

4. The computer-implemented method of claim 1, wherein analyzing the set of recorded actions via the machine learning method comprises analyzing the set of recorded actions via an autoencoder neural network.

5. The computer-implemented method of claim 1, wherein analyzing the set of recorded actions via the machine learning method comprises generating, by the machine learning method, a signature for each action in the set of recorded actions.

6. The computer-implemented method of claim 5, wherein classifying the action in the set of recorded actions as malicious based at least in part on determining that the action is anomalous compared to the other actions in the set of recorded actions comprises comparing a signature for the action with signatures for the other actions.

7. The computer-implemented method of claim 1, wherein classifying the action in the set of recorded actions as malicious comprises comparing the action to at least one labelled action of a known maliciousness category.

8. The computer-implemented method of claim 1, wherein classifying the action in the set of recorded actions as malicious based at least in part on determining that the action is anomalous compared to the other actions in the set of recorded actions comprises comparing the action to the other actions via a radial classifier.

9. The computer-implemented method of claim 1, wherein:

creating the set of recorded actions by recording actions performed by the computing-system tool on the computing system over the predetermined period of time comprises recording actions performed by iterations of the computing-system tool on a plurality of computing systems over the predetermined period of time; and classifying the action in the set of recorded actions as malicious based at least in part on determining that the action is anomalous compared to the other actions in the set of recorded actions comprises comparing the action to recorded actions performed on the plurality of computing systems.

10. A system for detecting malicious and protecting against malicious use of legitimate computing-system tools, the system comprising:

an identification module, stored in memory, that identifies a computing-system tool that can perform benign actions and malicious actions on a computing system;

a creation module, stored in memory, that creates a set of recorded actions by recording actions performed by the computing-system tool on the computing system over a predetermined period of time;

an analysis module, stored in memory, that analyzes the set of recorded actions via a machine learning method that, for each action in the set of recorded actions, determines whether the action is anomalous compared to other actions in the set of recorded actions;

a classification module, stored in memory, that classifies an action in the set of recorded actions as malicious based at least in part on determining that the action is anomalous compared to the other actions in the set of recorded actions;

a security module, stored in memory, that initiates, in response to classifying the action as malicious, a security action related to the action; and at least one physical processor that executes the identification module, the creation module, the analysis module, the classification module, and the security module.

11. The system of claim 10, wherein the security module performs the security action by sending a representation of the action to a security application capable of detecting malicious actions in real-time based on stored representations of the malicious actions.

12. The system of claim 10, wherein the identification module identifies the computing-system tool by identifying the computing-system tool that is installed as part of a default configuration of an operating system of the computing system.

13. The system of claim 10, wherein the analysis module analyzes the set of recorded actions via the machine learning method by analyzing the set of recorded actions via an autoencoder neural network.

14. The system of claim 10, wherein the analysis module analyzes the set of recorded actions via the machine learning method by generating, by the machine learning method, a signature for each action in the set of recorded actions.

15. The system of claim 14, wherein the classification module classifies the action in the set of recorded actions as malicious based at least in part on determining that the action is anomalous compared to the other actions in the set of recorded actions by comparing a signature for the action with signatures for the other actions.

16. The system of claim 10, wherein the classification module classifies the action in the set of recorded actions as malicious by comparing the action to at least one labelled action of a known maliciousness category.

17. The system of claim 10, wherein the classification module classifies the action in the set of recorded actions as malicious based at least in part on determining that the action is anomalous compared to the other actions in the set of recorded actions by comparing the action to the other actions via a radial classifier.

18. The system of claim 10, wherein:

the creation module creates the set of recorded actions by recording actions performed by the computing-system tool on the computing system over the predetermined period of time by recording actions performed by iterations of the computing-system tool on a plurality of computing systems over the predetermined period of time; and the classification module classifies the action in the set of recorded actions as malicious based at least in part on determining that the action is anomalous compared to the other actions in the set of recorded actions by comparing the action to recorded actions performed on the plurality of computing systems.

19. A non-transitory computer-readable medium comprising one or more computer-readable instructions that, when executed by at least one hardware-implemented processor of a computing device, cause the computing device to:

identify a computing-system tool that can perform benign actions and malicious actions on a computing system;

create a set of recorded actions by recording actions performed by the computing-system tool on the computing system over a predetermined period of time;

analyze the set of recorded actions via a machine learning method that, for each action in the set of recorded actions, determines whether the action is anomalous compared to other actions in the set of recorded actions;

classify the action in the set of recorded actions as malicious based at least in part on determining that the action is anomalous compared to the other actions in the set of recorded actions; and initiate, in response to classifying the action as malicious, a security action related to the action.

20. The non-transitory computer-readable medium of claim 19, wherein the one or more computer-readable instructions cause the computing device to perform the security action by sending a representation of the action to a security application capable of detecting malicious actions in real-time based on stored representations of the malicious actions.

* * * * *